US011220571B2

(12) United States Patent
Carboni et al.

(10) Patent No.: US 11,220,571 B2
(45) Date of Patent: Jan. 11, 2022

(54) AQUEOUS POLYURETHANE DISPERSIONS

(71) Applicant: Lamberti SPA, Albizzate (IT)

(72) Inventors: Stefano Carboni, Lurago d'Erba (IT); Dario Conti, Castano Primo (IT); Karine Coget, Somma Lombardo (IT); Domenico Vetri, Gallarate (IT); Giovanni Floridi, Novara (IT); Giuseppe Li Bassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 151 days.

(21) Appl. No.: 16/490,193

(22) PCT Filed: Mar. 23, 2018

(86) PCT No.: PCT/EP2018/057461

§ 371 (c)(1),
(2) Date: Aug. 30, 2019

(87) PCT Pub. No.: WO2018/172526

PCT Pub. Date: Sep. 27, 2018

(65) Prior Publication Data

US 2020/0010602 A1 Jan. 9, 2020

(30) Foreign Application Priority Data

Mar. 23, 2017 (IT) ........................ 102017000032367

(51) Int. Cl.

| | |
|---|---|
| ***C08G 18/08*** | (2006.01) |
| ***C08G 18/12*** | (2006.01) |
| ***C08G 18/32*** | (2006.01) |
| ***C08G 18/34*** | (2006.01) |
| ***C08G 18/44*** | (2006.01) |
| ***C08G 18/70*** | (2006.01) |
| ***C08G 18/75*** | (2006.01) |
| ***C09D 175/06*** | (2006.01) |
| ***C08G 18/30*** | (2006.01) |
| ***C14C 11/00*** | (2006.01) |

(52) U.S. Cl.

CPC ......... *C08G 18/0823* (2013.01); *C08G 18/12* (2013.01); *C08G 18/302* (2013.01); *C08G 18/3231* (2013.01); *C08G 18/348* (2013.01); *C08G 18/44* (2013.01); *C08G 18/706* (2013.01); *C08G 18/755* (2013.01); *C09D 175/06* (2013.01); *C14C 11/006* (2013.01)

(58) Field of Classification Search

CPC .......................... C08G 18/0823; C08G 18/12; C08G 18/3231; C08G 18/348; C08G 18/44; C08G 18/706; C08G 18/755; C08G 18/302; C09D 175/06; C14C 11/006

See application file for complete search history.

(56) References Cited

U.S. PATENT DOCUMENTS

| | | | |
|---|---|---|---|
| 6,214,331 B1 * | 4/2001 | Vanderhoff | A61L 27/16 424/423 |
| 6,284,836 B1 | 9/2001 | Hassel et al. | |
| 6,649,487 B2 | 11/2003 | Hashimoto et al. | |
| 7,767,735 B2 * | 8/2010 | Koganehira | C09D 11/40 523/160 |
| 2008/0193522 A1 * | 8/2008 | Meier | A61K 9/2077 424/461 |
| 2008/0207821 A1 * | 8/2008 | Weber | C08L 2666/06 524/517 |
| 2012/0244134 A1 * | 9/2012 | Chen | A23L 33/10 424/94.1 |
| 2014/0349093 A1 * | 11/2014 | Hasskerl | C09J 4/06 428/213 |
| 2015/0259566 A1 | 9/2015 | Broglie et al. | |
| 2020/0079958 A1 * | 3/2020 | Staff | C08G 18/4845 |

FOREIGN PATENT DOCUMENTS

| | | |
|---|---|---|
| EP | 1489120 B1 | 7/2004 |
| WO | 2004060949 A1 | 7/2004 |
| WO | 2006072080 A1 | 6/2006 |
| WO | 2008101661 A1 | 8/2008 |
| WO | 2010015494 A2 | 11/2010 |
| WO | 2016102596 A1 | 6/2016 |

OTHER PUBLICATIONS

International Search Report for PCT/EP2018/057461 dated Sep. 27, 2018.
Written Opinion of the international Search Authority for PCT/EP2018/057461 dated Sep. 27, 2018.

* cited by examiner

*Primary Examiner* — Patrick D Niland
(74) *Attorney, Agent, or Firm* — Vorys, Sater, Seymour and Pease LLP; Iona Niven Kaiser

(57) ABSTRACT

Process for the preparation of aqueous polyurethane dispersions, containing from 20 to 50% by weight of an anionic polyurethane having a mean particle size from 1 to 15 micron and providing films with durable low gloss aspect.

16 Claims, No Drawings

AQUEOUS POLYURETHANE DISPERSIONS

CROSS REFERENCE TO RELATED APPLICATIONS

This application is the U.S. national phase of PCT/EP2018/057461 filed on Mar. 23, 2018, which claims priority to Italian patent application no. 102017000032367 filed on Mar. 23, 2017, the contents of both applications are hereby expressly incorporated by reference in their entireties herein.

The present invention relates to a process for preparing aqueous polyurethane dispersions that provide low gloss coatings, whose matt aspect is resistant to prolonged heat and light exposure, and to their use as filming and matting agents for the coating of rigid or flexible objects. These aqueous dispersions are particularly useful for the finishing of leather and artificial leather, but also for the superficial treatment of fabrics, paper, cardboard, plastic, wood and metals.

STATE OF THE ART

The surface of many manufactured articles, by way of example made from woven fabrics, leather, paper, plastic, wood and metal, is treated with the purpose of making it more homogeneous, or of protecting it from the wear of the time or the atmosphere and/or in order to improve certain aesthetic properties, such as high or low gloss, soft or rough touch, different colours, and so on.

Normally these effects are obtained through the application of dispersions of polymers containing several specific additives. In case of polyurethane dispersions, a greater matt effect can be obtained, by way of example, by the addition of matting particles. These matting particles can be silica particles, as described in U.S. Pat. No. 6,284,836, or polymer particles, as described in U.S. Pat. No. 6,649,487.

Nevertheless, the addition of heterogeneous particles has the disadvantage of destabilizing the polymer compositions and of increasing the brittleness of the film.

Moreover, during the application, a separation of the heterogeneous materials can occur with consequent heterogeneity of the optical effect along the surface of the treated material.

The use of amorphous or crystalline silica in order to increase the degree of matt in the final manufactured article is moreover dangerous for the operators' health, if the necessary safeguards measures are not carefully applied.

The siliceous particles, because of their extreme fineness and volatility, are in fact the object of continuous studies from medical institutes of research for the risk of pulmonary diseases that they can provoke.

In the literature many methods are reported that avoid the use of matting particles.

WO 2004/060949, as an example, describes the use of compositions based on a self-crosslinkable polyurethane that allow to obtain products with a gloss below 40; according to an embodiment of the same patent application, reactive vinyl diluents are employed and polymerized in the dispersion.

WO 2010/015494 discloses anionic polyurethane dispersions based on a polyglycol ether, poly(tetramethyleneglycol), that provide films having low gloss and soft touch at the same time; soft touch effect or velvet effect is another superficial characteristic which is more and more appreciated by the market. Unfortunately, films from anionic polyurethane dispersions based on polyglycol ethers and polyesters tend to lose their matt aspect when exposed to ambient heat and light.

The scarce resistance to heat and light of polyglycol ether polyurethanes is also found with polyester based polyurethanes.

EP1,489,120 describes a photo-curable polyurethane emulsion which is able to produce films with good stability and soft touch.

WO 2006/072080 describes a polyurethane formulation useful for giving a soft and silky effect ("satinized and rubberish touch") on rigid surface. To this formulation, obtained from the reaction of a glossy polyurethane dispersion with a crosslinking agent, a matting agent ($SiO_2$) is added in order to obtain a coating with a low degree of gloss.

More recently, WO 2016/102596 relates to aqueous "soft touch" coating compositions of polyurethane vinyl polymer hybrid particles, obtained by free-radical polymerisation of at least one vinyl monomer in the presence of a polyurethane.

It has now been found that, by using polycarbonate diols in the synthesis of the polyurethane, possibly in the presence of a limited amount of other diols, and by stabilizing the dispersion with an acrylic thickener and a surfactant having HLB between 10 and 20, it is possible to obtain an aqueous dispersion of an anionic polyurethane, free or substantially free from organic solvents, that, without the addition of matt additives, is able to give films with durable low gloss (matt aspect).

The resistance of matt to light exposure is particularly desirable in the field of leather (artificial or natural) for automotive interiors, which makes the coating obtained by means of the dispersion of the present invention extremely valuable.

Moreover, the high, durable degree of matt is obtained by means of a stable and homogeneous (or easily re-dispersible) dispersion that does not gel or develop persistent sediments over time and moderate heat.

The dispersion contains little solvent, i.e. less than 5% by weight of organic solvent, preferably less than 3% by weight of organic solvent, or no solvent at all, and it is effective without the addition of external matting additives, such as silica, silicates or polymeric particles.

SUMMARY OF THE INVENTION

It is a fundamental object of the present invention a process for the preparation of aqueous polyurethane dispersions, containing from 20 to 50% by weight of an anionic polyurethane, the aqueous polyurethane dispersion having a mean particle size from 1 to 15 micron and gloss below 10 measured at 60° according to standard test method ISO 2813-2014, comprising the following steps:

i. a prepolymer is obtained by reacting:

I) an aliphatic or cycloaliphatic diisocyanate;

II) a polycarbonate diol and optionally a polyester diol with molecular weight between 500 and 3,000 g/mol, provided that the polycarbonate diol represents from 80 to 100% by weight of the diol II;

III) a diol having at least one carboxylic or carboxylate group;

IV) optionally a polyether diol with molecular weight between 500 and 3,000 g/mol;

V) optionally a compound different from the diols II, III and IV having one or more isocyanate (NCO) reactive groups;

VI) optionally an aliphatic or cycloaliphatic polyisocyanate having average functionality above 2, in such proportions that: A) the molar ratio between the sum of the NCO groups of I and VI and the sum of the NCO reactive groups of II, III, IV and V is between 1.2 and 3.0; B) the sum of polycarbonate diol and optional polyester diol represents from 80% to 100% by weight of the sum of the diols II and IV; C) the amount of diols II and IV represents from 90% to 100% by weight, preferably from 95% to 100% by weight, more preferably 100% by weight of the sum of II, IV and V; D) the amount of III is such that the prepolymer contains from 10 to 20 meq/100 g dry matter of carboxylic or carboxylate groups; E) the amount of VI, if present, does not exceed 3% by weight of the sum of I and VI, ii. the prepolymer is chain extended in water in the presence of from 0.1 to 2% by weight, preferably from 0.3% to 1% by weight of a surfactant having HLB from 10 to 20, based on the weight of the final aqueous polyurethane dispersion;

iii. from 0.1 to 10% by weight of an acrylic emulsion thickener, based on the weight of the final aqueous polyurethane dispersion, is added to the intermediate aqueous polyurethane dispersion obtained from step ii), the process being carried out without using any organic solvent, or with less than 5% by weight of an organic solvent on the weight of the final aqueous polyurethane dispersion.

Another object of the present invention is an aqueous polyurethane dispersion, that forms films having gloss below 10 measured at 60° according to standard test method ISO 2813-2014, containing:

a) from 20 to 50% by weight of an anionic polyurethane having mean particle size from 1 to 15 microns prepared by chain extending in water a prepolymer obtained by reacting:

I) an aliphatic or cycloaliphatic diisocyanate;

II) a polycarbonate diol and, optionally, a polyester diol with molecular weight between 500 and 3,000 g/mol, provided that the polycarbonate diol represents from 80 to 100% by weight of the diol II;

III) a diol having at least one carboxylic or carboxylate group;

IV) optionally a polyether diol with molecular weight between 500 and 3,000 g/mol;

V) optionally a compound different from the diols II, III and IV having one or more isocyanate (NCO) reactive groups;

VI) optionally an aliphatic or cycloaliphatic polyisocyanate, in such proportions that: A) the molar ratio between the sum of the NCO groups of I and VI and the sum of the NCO reactive groups of II, III, IV and V is between 1.2 and 3.0; B) the sum of polycarbonate diol and optional polyester diol represents from 80% to 100% by weight of the sum of the diols II and IV; C) the amount of diols II and IV represents from 90% to 100% by weight, preferably from 95% to 100% by weight, more preferably 100% by weight of the sum of II, IV and V; D) the amount of III is such that the prepolymer contains from 10 to 20 meq/100 g dry matter of carboxylic or carboxylate groups; E) the amount of VI, if present, does not exceed 3% by weight of the sum of I and VI, b) from 0.1 to 2% by weight, preferably from 0.3 to 1% by weight, of a surfactant having HLB from 10 to 20;

c) from 0.1 to 10% by weight of an acrylic emulsion thickener, d) less than 5% by weight of organic solvent.

According to another aspect, the invention relates to a method for coating leather or artificial leather comprising obtaining an aqueous polyurethane dispersion prepared according to the above described and here below detailed process, applying it to their upper (finished and exposed to sight) surface and drying.

According to yet another aspect the invention relates to a method for coating woven fabrics, paper, cardboard, plastic, wood or metals comprising obtaining an aqueous polyurethane dispersion prepared according to the above described and here below detailed process, applying it to their upper surface and drying.

DETAILED DESCRIPTION OF THE INVENTION

Examples of diisocyanates useful for the preparation of the polyurethane of the present invention are 1-isocyanate-3-isocyanate-methyl-3,5,5-trimethylcyclohexane (or isophoronediisocyanate), 4,4'-dicyclohexyl-methane-diisocyanate, hexamethylenediisocyanate, and mixtures thereof; most preferably the diisocyanate is isophoronediisocyanate. Mixtures of aliphatic and cycloaliphatic diisocyanates may be used.

The polycarbonate and polyester diols that can be used in the preparation of the prepolymer have molecular weight of 500 to 3,000, preferably from 800 to 1,500, more preferably about 1,000, (in g/mol), and are those commonly used in the field and known to the experts in the art.

The expression molecular weight used in this text, when referred to polymeric monoalcohols, diols and polyols, is the molecular weight (MW) in g/mol calculated from their hydroxyl number ($N_{OH}$), analyzed according to standard test method ASTM D4274-11 (i.e. $MW=56,100 \cdot F_{OH}/N_{OH}$, where $F_{OH}$ is the nominal hydroxyl functionality per polymeric chain).

The useful polycarbonate diols may be obtained by reacting carbonic acid derivatives, such as diaryl carbonates, e.g. diphenyl carbonate, dialkyl carbonates, e.g. dimethyl carbonate, or phosgene, with diols. Suitable diols include ethylene glycol, 1,2- and 1,3-propanediol, 1,3- and 1,4-butanediol, 1,5-pentanediol, 1,6-hexanediol, cyclohexane dimethanol, diethylene glycol, dipropylene glycol, neopentylglycol and mixtures thereof.

Polycarbonate diols from 1,6-hexanediol and/or 1,5-pentanediol, and especially those from 1,6-hexanediol alone, are most preferred.

Polycarbonate diols are the diols of choice as component II of the process, because the low gloss of the films obtained from polycarbonate-based polyurethanes has better resistance upon prolonged light and heat exposure.

Therefore, preferably, polycarbonate diols represents from 90 to 100%, more preferably from 95 to 100%, most preferably 100% by weight of the diols II.

If present, the polyester diols are obtained, for example, by reacting aliphatic, aromatic or cycloaliphatic dicarboxylic acids, or possibly the corresponding anhydrides, with diols, optionally in the presence of known esterification catalysts.

Examples of suitable dicarboxylic acids include adipic, glutaric, pimelic, suberic, nonanedicarboxylic, decanedicarboxylic, succinic, maleic, sebacic, azelaic, terephthalic, isophthalic, o-phthalic, tetrahydrophthalic, hexahydrophthalic, trimellitic, 1,4-cyclohexanedicarboxylic acid; examples of suitable anhydride include succinic, o-phthalic and trimellitic anhydride; various commercially available dimeric fatty acids in saturated (hydrogenated) or unsaturated form may also be used as the dicarboxylic acid.

Adipic acid is particularly preferred.

Examples of suitable diols for the preparation of the polyester diols are ethanediol, di-, tri-tetraethylene glycol, 1,2 propanediol, di-, tri-, tetrapropylene glycol, 1,3-propanediol, 1,4-butanediol, 1,3-butanediol, 2,3-butanediol, 1,6-hexanediol, 1,5-pentanediol, 2,2-dimethyl-1,3-propanediol (neopentylglycol), 1,4-dihydroxycyclohexane, 1,4-dimethylcyclohexane, 1,8-octanediol, 1,10-decanediol, 1,12-decanediol, 2,2,4- and/or 2,4,4-trimethyl-1,3-pentanediol and mixtures thereof.

Other useful polyester diols are those obtainable from diol initiated polymerization of hydroxy carboxylic acids containing from 2 to 26, and preferably from 4 to 12, carbon atoms or a lactone thereof. The hydroxy carboxylic acids may be saturated or unsaturated, linear or branched. Examples of suitable hydroxy carboxylic acids are glycolic acid, lactic acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid and 4-hydroxydecanoic acid.

Examples of suitable lactones are β-propiolactone and optionally $C_1$-$C_6$-alkyl substituted δ-valerolactone and ε-caprolactone, such as β-methyl-δ-valerolactone.

Polyester diols obtained from ε-caprolactone and polyester diols obtained from adipic acid and 1,6-hexanediol are especially preferred.

A certain amount of polyether diols IV may also be included in the synthesis the anionic polyurethanes of the invention without compromising the degree and resistance of the matt aspect of the resulting films.

Examples of suitable polyether diols IV include products obtained by the polymerisation of cyclic oxides, for example ethylene oxide, propylene oxide, butylene oxide, tetrahydrofuran, and mixture thereof. Especially useful polyether diols include polyoxypropylene diol, poly(oxyethylene-oxypropylene) diol and poly(tetramethylene glycol). The preferred polyether diol is poly(tetramethylene glycol).

In the preferred embodiment of the invention, the sum polycarbonate and optional polyester diol II represents in weight from 90% to 100%, more preferably from 95% to 100% and most preferably 100% by weight of the sum of the diols II and IV.

The diols II and IV are preferably non-ionic and non self-crosslinkable, i.e. they do not contain any group that can react with other groups of the final polyurethane.

The components V are preferably non-ionic and can be selected from diols different from II and III, polyols, primary or secondary amines, thiols, monoalcohols having isocyanate reactive groups, i.e. functional groups that are able to react with the isocyanate groups.

Examples of diols V different from II and III are propylene glycol, 1,4-butanediol, 1,6-hexanediol, neopentylglycol, cyclohexane dimethanol and mixtures thereof.

Examples of polyols V are glycerin, pentaerythritol, trimethylolpropane and its derivatives, such as trifunctional polypropylene glycol started on trimethylolpropane.

Preferably polyols and other components having more than two isocyanate reactive groups represent at most 3% by weight of the sum of the components II, IV and V; more preferably, they are not present among the components V.

Examples of suitable monoalcohols (monofunctionals alcohols) V are (cyclo)aliphatic (i.e. cycloaliphatic or aliphatic) $C_1$-$C_8$, linear or branched, monoalcohols.

The monoalcohol may be chosen, by way of example, among isopropanol, butyl alcohol, 1-hexanol, 2-ethyl-1-hexanol.

Examples of primary or secondary amines V that can be used are butylamine, isobutylamine, isopropylamine, diethanolamine; propoxylated and/or ethoxylated monoamine (e.g. Jeffamine® series M, such as Jeffamine® M600, from Huntsman) are also useful as the amine V.

Examples of thiols V are methanethiol, ethanethiol, isopropanethiol, n-propanethiol, n-butanethiol, isobutanethiol, sec-butanethiol, tert-butanethiol.

The diol III of the prepolymer is a carboxylic acid or salt thereof, preferably a carboxylic acid or salt thereof which is substituted in the position 2 by two hydroxymethyl groups; more preferably component III is dimethylolpropionic acid (DMPA), dimethylolbutanoic acid (DMBA) or mixtures thereof; most preferably the diol III is dimethylolbutanoic acid.

The total amount of carboxylic and carboxylate groups in the polyurethane is measured in milliequivalents (meq) of groups COOH and $COO^-$ for 100 g of prepolymer. In the anionic polyurethanes of the present invention this value is in the range from 10 to 20, preferably in the range from 12 to 18; the best compromise in terms of degree of matt (which is favoured by a low amount of carboxylic and carboxylate groups) and stability of the dispersion (which is favoured by a high amount of carboxylic and carboxylate groups) is obtained when this value is comprised between 13 and 17.

Component VI is an organic polyisocyanate having average functionality above 2, preferably from 2.3 and 4.

Examples of suitable polyisocyanate VI are hexamethylene diisocyanate isocyanurate, hexamethylene diisocyanate biuret, isophoronediisocyanate isocyanurate and isophoronediisocyanate biuret. Preferably, component VI is not used in the preparation of the prepolymer.

In the prepolymer the molar ratio between the sum of the isocyanate groups (NCO) of I and VI and the sum of the isocyanate reactive groups of II, III, IV and V is between 1.2 and 3.0, preferably between 1.8 and 2.5, most preferably between 2.0 and 2.3. Higher ratios result in undesirable hard coatings, lower ratios results in polyurethane dispersions that are more prone to destabilization (separation of part of the polymer in the form of visible gelled particles with possible sedimentation, or gelification of the entire mass).

The process for obtaining the aqueous polyurethane dispersion of the present invention step is preferably carried out by using less than 3% by weight of organic solvent based on the weight of the final dispersion, more preferably in the absence of organic solvents, an excess of solvent being detrimental to the matt of the resulting coating.

The aqueous polyurethane dispersions of the invention preferably contain less than 3% by weight of organic solvent, more preferably no organic solvent at all.

In the process, step i is preferably performed at temperature between 40 and 110° C. A catalyst may be used to accelerate the reaction.

When the addition of an organic solvent is required by the viscosity of the prepolymer or of the reaction mixture of step i), low boiling point solvents such as methyl ethyl ketone, ethyl acetate and acetone, or high boiling solvents such as 2,5,8,11,14-pentaoxopentadecane, dipropylene glycol dimethyl ether, propyleneglycol monomethyl ether acetate, dipropyleneglycol monomethyl ether acetate, propyleneglycol diacetate, diethyleneglycol monobutyl ether acetate, N-methylpyrrolidone, N-ethylpyrrolidone, N-butylpyrrolidone, tetraethylene glycol dimethyl ether can be used in the preparation of the prepolymer. The low boiling solvent, if present, is preferably removed by evaporation after dispersion in water of the prepolymer.

The preferred solvents are high boiling solvents and in particular 2,5,8,11,14-pentaoxopentadecane and dipropylene glycol dimethyl ether. The most preferred solvent is 2,5,8,11,14-pentaoxopentadecane.

When the diol III is used in acid form, the prepolymer obtained at the end of stage i is normally neutralized, preferably with tertiary amines, like N-alkylmorpholines, trialkylamines, alkylalkanolamines, trialkanolamines and mixtures thereof, at temperature below 90° C.

Triethylamine, dimethylethanolamine and N-ethylmorpholine are particularly suited for this scope.

Advantageously, the diol III is neutralized before the reaction of step i takes place. The neutralization can also be carried out during the dispersion in water of the prepolymer (step ii).

Step ii is carried out in water (or in water and neutralizing agent) under mechanical stirring in the presence of from 0.1 to 2%, preferably from 0.3 to 1%, by weight of a surfactant having HLB (hydrophilic lipophilic balance) from 10 to 20, preferably from 12 to 20, more preferably from 17 to 20, most preferably from 18 to 20, that can be measured by the formula $HLB=20 \cdot Mh/M$ where Mh is the molecular mass of the hydrophilic portion of the molecule, and M is the molecular mass of the whole molecule.

The surfactant can be chosen between non-ionic and anionic surfactants, but is preferably a non-ionic surfactant, more preferably a linear or branched aliphatic ethoxylated alcohol.

Particularly preferred are $C_{10}$-$C_{14}$ alcohols having HLB from 17 to 20, most preferably from 18 to 20.

It has been found that aliphatic ethoxylated $C_{10}$-$C_{14}$ alcohols having HLB from 18 to 20, beside providing stable dispersions, improve or at least preserve the matt aspect of the resulting film.

In step ii, the chain extension in performed in water, preferably in the presence of diamines as chain extenders. Diamines that can be used as chain extender are diamines having at least 2 active hydrogens toward the NCO group, such as hydrazine, ethylenediamine, piperazine, 1,5-pentanediamine, 1,6-hexanediamine, isophoronediamine, diethylenetriamine; sulfonated diamines or salts thereof can also be used. The extension of chain carried out with the diamine sulfonate increases the stability and above all the re-dispersibility (in case of sediment on the bottom) of the dispersion, without changing the particle size of the dispersion of the prepolymer.

Examples of diamine sulfonate utilizable are salts of alkali metals of 1,1-diaminomethanesulfonic acid, of 1,1-di(aminoethyl)ethanesulfonic acid, of 2-[(2-aminoethyl) amino]ethanesulfonic acid, of 3-[(2-aminoethyl)amino] propanesulfonic acid, of diaminobenzenesulfonic acids, diaminomethanesulfonic acid, 1,1-diaminopropanesulfonic acid, 1,2-diaminopropanesulfonic acid.

Preferably, the diamine sulfonate is chosen among sodium salts of 2-[(2-aminoethyl)amino]ethanesulfonic acid, of 3-[(2-aminoethyl) amino]propanesulfonic acid, and mixtures thereof, most preferably is the sodium salt of 2-[(2-aminoethyl)amino]ethanesulfonic acid.

The chain extender is preferably a mixture of non-ionic diamine, in particular hydrazine, and sulfonate diamine, in particular sodium salt of 2-[(2-aminoethyl)amino]ethanesulfonic acid. Typically, in step ii, the equivalent amount of chain extender(s) is from 3 to 100%, preferably from 70 to 90%, of the free NCO groups contained in the prepolymer.

Step ii of the process of the invention is preferably carried out percolating the prepolymer in water containing the surfactant. After dispersion of the prepolymer, the chain extender may be added to provide the chain extended polyurethane dispersion. The temperature of this step is preferably maintained below 40° C.

According to one of the characterising features of the invention, the aqueous polyurethane dispersion prepared with the procedure described above is thickened by adding from 0.1 to 10% by weight, preferably from 0.3 to 2% by weight, most preferably from 0.3 to 1% by weight, of an acrylic thickener, prepared by any known radical polymerization process, such as emulsion, inverse emulsion, suspension, solution and bulk polymerization of acrylic monomers.

With the expression "acrylic monomers" we mean monomers derived from acrylic acid, methacrylic acid and mixtures thereof.

With the expression "acrylic thickeners" we mean thickeners synthesized from acrylic monomers, that is monomers derived from acrylic acid, methacrylic acid and mixtures thereof.

Preferably, the acrylic thickener useful for the realization of the present invention are prepared by emulsion polymerization, i.e. they are acrylic emulsion thickeners, preferably based on methacrylic acid and ethyl acrylate.

In an advantageous embodiment, the acrylic thickeners, and in particular the acrylic emulsion thickeners, are used in step iii) of the process in diluted form, by way of example diluted in aqueous compositions comprising from about 3 to about 50% by weight a.m. (active matter) of the acrylic emulsion thickener, more preferably from about 4 to about 10% by weight of acrylic emulsion thickener. Said diluted aqueous compositions are obtainable by simply diluting in water commercially available acrylic emulsion thickeners, possibly adjusting their pH to about 4-6 with a base.

In principle, diluted acrylic emulsion thickeners having higher and lower active matter might be used but are less advantageous for strictly practical reasons.

Suitable acrylic emulsion thickeners based on methacrylic acid and ethyl acrylate are alkali swellable acrylic emulsion thickeners (ASE), possibly including hydrophobic polyethoxylated monomers (such as (meth)acrylic esters of ethoxylated $C_1$-$C_{22}$ fatty alcohols) (HASE) and/or polyethylenically unsaturated monomers (crosslinkers) (CHASE/CASE).

The preferred thickener for this invention is an acrylic emulsion thickener based on methacrylic acid (25-50% by weight of the monomers), ethyl acrylate (40-70% by weight of the monomers), polyethylenically unsaturated monomer (0-1% by weight), (meth)acrylic esters of ethoxylated $C_1$-$C_{22}$ fatty alcohols (0-20% by weight).

The more preferred thickener for this invention are thickeners based on methacrylic acid (25-50% by weight of the monomers), ethyl acrylate (40-70% by weight of the monomers), polyethylenically unsaturated monomer (0.005-0.5% by weight, most preferably 0.01-0.2% by weight), (meth) acrylic esters of ethoxylated $C_1$-$C_{22}$ fatty alcohols (0-15% by weight).

It has surprisingly been found that acrylic emulsion thickeners, beside providing stable dispersions, remarkably diminish the gloss of the films obtainable from the aqueous polyurethane dispersion of the invention.

The process of the invention provides a milky aqueous anionic polyurethane dispersion with a mean particle size from 1 to 15 micron, preferably from 2 to 10 micron (D[0.5]) as measured by an instrument that measures the particles size and the particle size distribution by laser diffraction (Mastersizer 2000 from Malvern) and it guarantees, as shown in the examples, the stability or re-dispersibility of the dispersion itself.

The viscosity of the aqueous polyurethane dispersion of the present invention is generally from 200 to 2,000 mPa·s, more preferably from 500 to 1,000 mPa·s.

Advantageously, the aqueous polyurethane dispersion of the invention does not need to contain, and it does not contain, any additional matting agent (i.e. any conventional matting agent and any additional ingredient that are known to improve the low gloss of the dispersion).

Non-matting additives may be present in the aqueous polyurethane dispersion in order to otherwise improve its performance, such as, by way of example, heat stabilizers, coalescing agents, plasticizers, levelling agents, anti-slip agents, anti-cratering agents, and the like.

The aqueous dispersions of the present inventions are stable, i.e. homogeneous or re-dispersible and do not develop excessive viscosity upon storage.

The aqueous dispersions are defined homogeneous when they remain homogeneous when stored in a closed jar at 50° C. for at least 30 days.

The aqueous dispersions are defined re-dispersible when, stored in a closed jar at 50° C. for at least 30 days they develop a sediment which is dispersible by the simple manual shaking of the jar.

In the preferred embodiments where the surfactant has HLB from 17 to 20 and the amount of acrylic emulsion thickener is from 0.3 to 2% by weight, the aqueous dispersions of the present inventions are homogeneous.

The aqueous polyurethane dispersions of the present invention can be combined and crosslinked with all external crosslinking agents known to those skilled in the art, such as with hydrodispersible polyisocyanates, polyaziridines, carbodiimides, epoxysilanes, aminosilanes.

Said crosslinking agents are generally added in an amount comprised between 1 and 10% on dry weight of the dispersion.

Advantageously, the crosslinking does not modify the low gloss of the films that are obtained from the dispersions, but can be useful in order to increase the mechanical and chemical properties of the films.

The film forming aqueous polyurethane dispersions of the present invention have gloss below 10, preferably below 2, more preferably below 1, measured at 60° according to standard test method ISO 2813-2014 and are advantageously utilisable in the finishing of leather and artificial leather, in the superficial coating of woven fabrics, paper, plastics, such as polycarbonates and PVC, wood and metals.

The materials coated with films obtained from the aqueous dispersions of the invention can be advantageously used on car interiors to cover the instrumentations or the internal side of car doors, on electronic products like mobile phones, i-pod®, i-pad®, and PDA.

The films obtained from the dispersions, by applying typically at least 3 g/m$^2$, preferably from 5 to 10 g/m$^2$ of polyurethane, show low gloss and soft touch, without using solid external matting agents.

In the examples that follow the preparations of aqueous polyurethane dispersions according to the present invention and of comparative dispersions are reported, together with the main characterization of the products obtained.

The particle size of the dispersions has been measured by means of a Mastersizer 2000 from Malvern.

The dry matter has been determined with an IR dryer, Mettler Toledo HB 43, at a temperature of 160° C.

The stability has been determined by means of an aging test in oven for 30 days at 50° C. and classified with a scale from 1 to 3 (1—homogeneous=good, 2—re-dispersible sediment or Brookfield® viscosity increase<20%=acceptable, 3—gummy sediment or gelation=unacceptable).

The gloss has been determined by means of application of the polyurethane dispersion on a black card and measured at 60°, following the ISO standard method 2813-2014.

Resistance to heat and irradiation has been evaluated by laying a film from the aqueous polyurethane dispersion on black card (Leneta FORM 2-A) and undergoing the sample to a sunlight source (0.55 W) at 90° C. for 72 h (Suntest, 295 nm Daylight Q filter) or without sunlight source at 100° C. for 240 h and at 120° C. for 72 h (Heat-Ageing Test). By measuring the gloss at 60° before and after Suntest and Heat-Ageing Test is possible to evaluate the resistance of the film in terms of matt, that is visually classified with a scale from 5 (matt unaltered) to 1 (glossy)

The following materials were used in the examples described afterwards. 16 CD=polycarbonate diol from 1,6-hexanediol having molecular weight about 1,000 g/mol 16 PES=polyester diol from 1,6-hexanediol and adipic acid having molecular weight about 1000 g/mol PTMEG=polyether diol from tetrahydrofurane having molecular weight about 1000 g/mol PCL=polycaprolactone having molecular weight about 1000 g/mol DMBA=dimethylol butanoic acid TOU=2,5,8,11,14-pentaoxopentadecane DMM=dipropyleneglycol dimethylether TEA=triethylamine IPDI=isophoronediisocyanate EVS=sodium salt of 2-[(2-aminoethyl)amino]ethanesulfonic acid S1=$C_{12}$-$C_{14}$ fatty alcohol, 3 moles ethoxylated (surfactant, HLB 8)

S2=$C_{12}$-$C_{14}$ fatty alcohol, 9 moles ethoxylated (surfactant, HLB 13)

S3=$C_{12}$-$C_{14}$ fatty alcohol, 25 moles ethoxylated (surfactant, HLB 17)

S4=isotridecylic alcohol ethoxylated 40 moles (surfactant, HLB 18)

EXAMPLES

Example 1

376 g (0.22 mmol) of 16 CD, 16.2 g (0.064 mmol) of DMBA and 50 g of TOU are loaded in a stirred reactor equipped with thermometer and condenser, under nitrogen atmosphere and heated at 50° C.

11 g of TEA (0.064 mmol) are added under stirring and the temperature is maintained at about 50° C. for about 30 minutes.

236 g of IPDI (0.62 mmol) and 10 g of TOU are added under stirring.

The reaction mixture is then heated up and maintained at 70° C.; after about 60 minutes the content of NCO groups in the prepolymer is constant (the titration of the residual isocyanate groups has been made in this and all the other examples according to the standard test method ASTM D2572-97).

The prepolymer is dispersed in 1100 g of demineralized water containing 11 g of S2 under vigorous stirring and temperature of about 20° C. The chain extension is carried out adding 86 g of hydrazine and 35 g of EVS at temperature below 25° C. in about 1 hour. The obtained polyurethane dispersion is then divided in six samples (Ex. from 1-1 to 1-5 and 1).

An emulsion (SolH) containing 5.8% by weight of a crosslinked acrylic emulsion thickener (CASE1) based on methacrylic acid (MAA, about 40% wt), ethyl acrylate (EA about 60% wt), crosslinked with diallylphthalate is prepared by dilution from a commercial product, followed by pH correction to about 6 with dimethylethanolamine.

In each of the six samples of the polyurethane dispersion from 1-1 to 1-5 and 1, respectively, 0%, 0.15%, 0.30%, 0.50%, 0.70%, 0.85% of CASE1 (by weight, on the final dispersion) are added and finally the samples are filtered with a 150 μm canvas (dry matter: 28% by weight in the dispersion). Each sample is taken and its 60° gloss is analysed.

The results are summarized in Table 1.

TABLE 1

| Example | % CASE1 [1)] | 60° Gloss |
|---|---|---|
| 1-1* | 0.00 | 14 |
| 1-2 | 0.15 | 6.5 |
| 1-3 | 0.30 | 2.0 |
| 1-4 | 0.50 | 1.8 |
| 1-5 | 0.70 | 1.0 |
| 1 | 0.85 | 1.8 |

*comparative
[1)] weight percentage of the acrylic emulsion thickener (dry matter) on the final dispersion It can be seen that the addition of the acrylic thickener remarkably reduce the 60° gloss of the films.

Comparative Examples 2, 5-6 and Examples 3-4

Example 1 has been repeated using surfactants with different HLBs and PCL instead of 16 PC (same molar amount).

The 60° gloss and stability of each resulting dispersion is observed.

The results are summarised in Table 2.

The best results in terms of stability and gloss are achieved with the branched ethoxylated aliphatic alcohol having HLB about 18 (S4).

TABLE 2

| Example | Diol | Surfactant | (HLB) | 60° gloss | stability |
|---|---|---|---|---|---|
| 2* | 16PC | S1 | 8 | 2.9 | 3 |
| 1 | 16PC | S2 | 13 | 1.8 | 2 |
| 3 | 16PC | S3 | 17 | 2.4 | 1 |
| 4 | 16PC | S4 | 18 | 0.9 | 1 |
| 5* | PCL | S2 | 13 | 1.1 | 2 |
| 6* | PCL | S4 | 18 | 0.8 | 1 |

*comparative

Comparative Example 7 and 9 and Example 8

Example 4 has been repeated using a higher amount of solvent (comparative Example 7), no solvent at all (Example 8) and no solvent at all and PCL instead of 16 PC in the same molar amount (comparative Example 9), as reported in Table 3.

TABLE 3

| Example | Diol | wt % TOU | 60° gloss | stability |
|---|---|---|---|---|
| 4 | 16PC | 2.5 | 0.9 | 1 |
| 7* | 16PC | 5.2 | 13 | 1 |
| 8 | 16PC | 0 | 0.6 | 1 |
| 9* | PCL | 0 | 0.6 | 1 |

*comparative

It can be seen that an excess of organic solvent unacceptably increases the 60° gloss; on the other hand, the process of the invention can be carried out without organic solvent at all, thus providing stable dispersions and excellent matt films.

Example 10 and 11

Example 1-3 has been repeated but dispersing the prepolymer in 1100 g of demineralized water containing 97 g of hydrazine (without EVS) and using S4 as the surfactant, as reported in Table 4 (Example 10). Example 4 has been repeated but dispersing the prepolymer in 1100 g of demineralized water (without amine), as reported in Table 4 (Example 11).

TABLE 4

| Example | Chain extender* | Surfactant | 60° Gloss | Stability |
|---|---|---|---|---|
| 1-3 | 80 idrazine + 10 EVS | S2 | 2.0 | 2 |
| 10 | 90 idrazine | S4 | 1.8 | 1 |
| 4 | 80 idrazine + 10 EVS | S4 | 0.9 | 1 |
| 11 | water | S4 | 1.3 | 2 |

*eq. % based on NCO of the prepolymer and chemical nature

The tests show that satisfactory results can be obtained by chain extending in water alone or in the presence of a diamine and of a sulfonated chain extender or with a non sulfonated diamine chain extender.

Example 12

The preparation method of Example 4 has been repeated up to chain extension.

The obtained polyurethane dispersion is divided in seven samples (Ex. from 12-1 to 12-7). Five thickening solutions have been prepared by diluting in water commercial latexes of acrylic emulsion thickeners, followed by pH correction to about 6 with dimethylethanolamine, as reported in Table 5. The monomer compositions of the acrylic emulsion thickeners are the following:

CASE1: methacrylic acid (MAA) about 40% wt, ethyl acrylate (EA) about 60% wt and crosslinker (diallylphthalate)

ASE: MAA about 40% wt, EA about 60% wt

CHASE2: MAA about 40% wt, EA about 50% wt, methoxy(polyethyleneglycol) methacrylate (MW about 1000 g/mol) about 10% wt and crosslinker (diallylphthalate)

CHASE1: MAA about 34% wt, EA about 64% wt, methacrylic esters of 25 moles ethoxylated $C_{16}$-$C_{18}$ fatty alcohol (about 2% wt) and crosslinker (diallyl maleate)

HASE: MAA about 39% wt, EA about 60% wt, methacrylic esters of 25 moles ethoxylated $C_{22}$ fatty alcohol, about 1% wt.

TABLE 5

| Thickening solution | Acrylic emulsion thickener | Dry matter (wt %) |
|---|---|---|
| SolH | CASE1 | 5.8 |
| SolB | ASE | 5.5 |
| SolC | CHASE2 | 6.2 |
| SolD | CHASE1 | 6.2 |
| SolE | HASE | 6.3 |

One of the seven samples is used without thickener for comparison (blank, 12-1).

Another of the seven samples is thickened by addition of a HEUR (associative ethoxylated polyurethane) thickener (12-2).

In each of the other samples of the polyurethane dispersion from 12-3 to 12-7, respectively, a thickening solution is added to obtain a dispersion with Brookfield viscosity of about 800, as reported in Table 6.

For each of the seven samples the 60° gloss and stability (50° C., 30 days) has been observed and reported in Table 6.

For sample 12-2 the gloss could not be measured.

TABLE 6

| Example | Thickener | wt % of thickener (dry matter) | Stability | 60° Gloss |
|---|---|---|---|---|
| 12-1* | None | None | 3** | 15.0 |
| 12-2* | HEUR[1)] | 1.13 | 3** | nd |
| 12-3 | SolH | 0.90 | 1 | 0.7 |
| 12-4 | SolB | 2.21 | 1 | 0.7 |
| 12-5 | SolC | 0.75 | 1 | 0.8 |
| 12-6 | SolD | 0.57 | 1 | 0.8 |
| 12-7 | SolE | 0.63 | 1 | 2.1 |

*comparative
**unstable after 24 h at 50° C.
[1)]Viscolam 1016 from Lamberti SpA, Italy The tests show that all the acrylic emulsion thickeners provide stability and very good gloss values; the best results are obtained by crosslinked acrylic emulsion thickeners (CHASE or CASE), that at low dosage (<1 wt %) provide excellent 60° gloss values (<1).

Examples 13 and Comparative Example 14

Example 1 has been repeated but using DMM as the solvent, a NCO/OH ratio 1.8 and an amount of DMBA that provides 17 meq COOH/100 g of the prepolymer (Example 13).

Example 13 has been repeated but using 16 PES instead of 16 PC, in the same molar amount (Example 14, comparative).

Test for Matt Resistance Upon Heat and Irradiation

Samples from Examples 4, 13, comparative Examples 9 and 14 and from two commercial polyurethane dispersions for low gloss coatings were filmed on glass and tested for matt resistance upon prolonged heating and irradiation with a 0.55 W lamp. The results are summarized in Table 7.

TABLE 7

| Example | Diol | 60° gloss | $A_o$[1)] | A[2)] | A[3)] | A[4)] |
|---|---|---|---|---|---|---|
| 4 | 16PC | 0.9 | 5 | 5 | 4/5 | 5 |
| 13 | 16PC | 0.9 | 5 | 5 | 4/5 | 5 |
| 9* | PCL | 0.6 | 5 | 4 | 3 | 3 |
| 14* | 16PES | 1.1 | 5 | 4/5 | 3/4 | 4 |
| Rolflex OP 80*[5)] | PTMEG | 0.5 | 5 | 3 | 2 | 2 |
| NeoRez R 1010*[6)] | ND | 0.7 | 5 | 4 | 3 | 2/3 |

*comparative
[1)]Initial aspect
[2)]Aspect after 72 h at 120° C.
[3)]Aspect after 240 h at 100° C.
[4)]Aspect after 72 h at 90° C. and 0.55 W (Suntest, Daylight-Q filter from Q-Lab Corp.)
[5)]From Lamberti SpA, Italy
[6)]From DSM, USA The polyurethanes of Examples 4 and 13, which are based on polycarbonate diols and are made according to the process of the invention, provide excellent matt resistance.

Particle Size Measurements

The particle sizes of the aqueous polyurethane dispersions of the Examples from 1 to 11 are reported in Table 8.

TABLE 8

| Particle sizes [D0.5] in microns | | | | | | | | | | |
|---|---|---|---|---|---|---|---|---|---|---|
| Ex. 1 | Ex. 2* | Ex. 3 | Ex. 4 | Ex. 5* | Ex. 6* | Ex. 7* | Ex. 8 | Ex. 9* | Ex. 10 | Ex. 11 |
| 9.7 | 2.6 | 3.0 | 3.5 | 2.5 | 1.9 | 3.2 | 4.3 | 2.2 | 3.3 | 2.5 |

*comparative

The invention claimed is:

1. A process for the preparation of aqueous polyurethane dispersions, containing from 20 to 50% by weight of an anionic polyurethane, the aqueous polyurethane dispersion having a D0.5 mean particle size from 1 to 15 micron and gloss below 10 measured at 60° according to standard test method ISO 2813-2014, comprising the following steps:

i. obtaining a prepolymer by reacting:

I) an aliphatic or cycloaliphatic diisocyanate;

II) a polycarbonate diol and optionally a polyester diol with molecular weight between 500 and 3,000 g/mol, provided that the polycarbonate diol represents from 80 to 100% by weight of the diol II;

III) a diol having at least one carboxylic or carboxylate group;

IV) optionally a polyether diol with molecular weight between 500 and 3,000 g/mol;

V) optionally a compound different from the diols II, III and IV having one or more isocyanate (NCO) reactive groups;

VI) optionally an aliphatic or cycloaliphatic polyisocyanate having average functionality above 2, in such proportions that: A) the molar ratio between the sum of the isocyanate groups (NCO) of I and VI and the sum of the NCO reactive groups of II, III, IV and V is between 1.2 and 3.0; B) the sum of polycarbonate diol and optional polyester diol represents from 80% to 100% by weight of the sum of the diols II and IV; C) the amount of diols II and IV represents from 90% to 100% by weight of the sum of II, IV and V; D) the amount of III is such that the prepolymer contains from 10 to 20 meq/100 g dry matter of carboxylic or carboxylate groups; E) the amount of VI, if present, does not exceed 3% by weight of the sum of I and VI, ii. chain extending the prepolymer in water in the presence of from 0.1 to 2% by weight of a surfactant having HLB from 10 to 20, based on the final aqueous polyurethane dispersion; and iii. adding from 0.1 to 10% by weight of an acrylic emulsion thickener, based on the weight of the final aqueous polyurethane dispersion, to the intermediate aqueous polyurethane dispersion obtained from step ii), the process being carried out without using any organic solvent, or with less than 5% by weight of an organic solvent, based on the weight of the final aqueous polyurethane dispersion.

2. The process for the preparation of aqueous polyurethane dispersions according to claim 1 in which the polycarbonate diol is 1,6-hexanediol polycarbonate.

3. The process for the preparation of aqueous polyurethane dispersions according to claim 1 in which the surfactant has HLB from 17 to 20.

4. The process for the preparation of aqueous polyurethane dispersions according to claim 2 in which the surfactant has HLB from 17 to 20.

5. The process for the preparation of aqueous polyurethane dispersions according to claim 1 in which the diisocyanate is isophoronediisocyanate.

6. The process for the preparation of aqueous polyurethane dispersions according to claim 3 in which in step iii. from 0.3 to 2% by weight of the acrylic emulsion thickener is added.

7. The process for the preparation of aqueous polyurethane dispersions according to claim 4 in which in step iii. from 0.3 to 2% by weight of the acrylic emulsion thickener is added.

8. The process for the preparation of aqueous polyurethane dispersions according to claim 1, the process being carried out without using any organic solvent, or with less than 3% by weight of an organic solvent, based on the weight of the final aqueous polyurethane dispersion.

9. A method for coating leather or artificial leather comprising obtaining an aqueous polyurethane dispersion prepared according to the process of claim 1, applying it to their surface and drying.

10. The method for coating leather or artificial leather according to claim 9, in which the aqueous polyurethane dispersion does not contain any solid matting agent.

11. A method for coating woven fabrics, paper, cardboard, plastic, wood or metals comprising obtaining an aqueous polyurethane dispersion prepared according to the process of claim 1, applying it to their surface and drying.

12. The method for coating woven fabrics, paper, cardboard, plastic, wood or metals according to claim 11, in which the aqueous polyurethane dispersion does not contain any solid matting agent.

13. An aqueous polyurethane dispersion, that forms films having gloss below 10 measured at 60° according to standard test method ISO 2813-2014, containing:

a) from 20 to 50% by weight of an anionic polyurethane having a D0.5 mean particle size from 1 to 15 microns prepared by chain extending in water a prepolymer obtained by reacting:

I) an aliphatic or cycloaliphatic diisocyanate;

II) a polycarbonate diol and optionally a polyester diol with molecular weight between 500 and 3,000 g/mol, provided that the polycarbonate diol represents from 80 to 100% by weight of the diol II;

III) a diol having at least one carboxylic or carboxylate group;

IV) optionally a polyether diol with molecular weight between 500 and 3,000 g/mol;

V) optionally a compound different from the diols II, III and IV having one or more isocyanate (NCO) reactive groups;

VI) optionally an aliphatic or cycloaliphatic polyisocyanate having average functionality above 2, in such proportions that: A) the molar ratio between the sum of the isocyanate groups (NCO) of I and VI and the sum of the NCO reactive groups of II, III, IV and V is between 1.2 and 3.0; B) the sum of polycarbonate diol and optional polyester diols represents from 80% to 100% by weight of the sum of the diols II and IV; C) the amount of diols II and IV represents from 90% to 100% by weight of the sum of II, IV and V; D) the amount of III is such that the prepolymer contains from 10 to 20 meq/100 g dry matter of carboxylic or carboxylate groups; E) the amount of VI, if present, does not exceed 3% by weight of the sum of I and VI, b) from 0.1 to 2% by weight of a surfactant having HLB from 10 to 20;

c) from 0.1 to 10% by weight of an acrylic emulsion thickener, d) less than 5% by weight of organic solvent.

14. The process for the preparation of aqueous polyurethane dispersions according to claim 1 in which the acrylic emulsion thickener is adjusted to a pH of about 4 to 6 prior to addition to the final aqueous polyurethane dispersion.

15. The process for the preparation of aqueous polyurethane dispersions according to claim 1 in which the acrylic emulsion thickener is an alkali swellable emulsion thickener.

16. The process for the preparation of aqueous polyurethane dispersions according to claim 15, in which the alkali swellable emulsion thickener is obtained by reacting, based on the weight of the monomers:

from 25 to 50% by weight of methacrylic acid;

from 40 to 70% by weight of ethyl acrylate;

from 0.005 to 0.5% by weight of polyethylenically unsaturated monomer;

from 0 to 15% by weight of (meth)acrylic esters of ethoxylated C1-C22 fatty alcohols.

* * * * *